Jan. 18, 1966 K. W. EDMARK, JR 3,229,686
BLOOD PRESSURE AND HEART BEAT PULSE RATE MEASURING SYSTEM
Filed July 5, 1963 3 Sheets-Sheet 3

INVENTOR
KARL W. EDMARK, JR.
BY Herman L Gordon
ATTORNEY

United States Patent Office 3,229,686
Patented Jan. 18, 1966

3,229,686
BLOOD PRESSURE AND HEART BEAT PULSE
RATE MEASURING SYSTEM
Karl W. Edmark, Jr., Seattle, Wash., assignor to Physio-Control Company, Inc., Seattle, Wash., a corporation of Delaware
Filed July 5, 1963, Ser. No. 292,869
17 Claims. (Cl. 128—2.05)

This invention relates to apparatus for sensing, monitoring and recording blood pressure and heart beat pulses, and more particularly to an apparatus which employs a compressor member which receives an extremity such as a finger, toe, ear lobe, or the like, and uniformly compresses same while maintaining a plurality of spaced electrodes in conductive contact therewith.

A main object of the invention is to provide a novel and improved blood pressure and heart beat measuring apparatus employing an extremity compressor, said apparatus being employed to measure blood pressure and heart beat pulses in an efficient and accurate manner and being arranged so that the pressure of the fluid in the extremity compressor is accurately controlled.

A further object of the invention is to provide an improved apparatus for measuring blood pressure and heart beat pulses, said apparatus being of the type employing an extremity compressor provided with spaced electrodes, and the apparatus being arranged to respond to variations in the impedance between the electrodes caused by pulses of blood flowing in an extremity received in the extremity compressor.

A still further object of the invention is to provide an improved apparatus for measuring blood pressure and heart beat pulses, said apparatus operating by the change in resistance between a pair of spaced electrodes in contact with an extremity, said change being caused by the flow of pulses of blood through the extremity, the apparatus automatically controlling the fluid pressure in a compressor device which receives the extremity, permitting small amounts of blood to flow into the extremity at regular intervals, maintaining viability and preventing pain or swelling of the extremity, whereby continuous blood pressure and pulse monitoring can be effected over periods of many hours, or even days.

A still further object of the invention is to provide an improved blood pressure and heart beat measuring apparatus operating on the principle of electrical impedance change produced in a finger, toe, or ear, or other extremity of a subject resulting when blood flows into the extremity, the apparatus being stable in operation, providing continuous monitoring action for increasing or decreasing blood pressure, and being useful for continuous blood pressure and pulse monitoring over long periods of time, for example, in operating rooms and other parts of hospitals, or in other situations, such as in space vehicles, human centrifuges, and the like, being equally well suited for use on human beings or on experimental animals.

Further objects and advantages of the invention will become apparent from the following description and claims, and from the accompanying drawings, wherein:

FIGURES 4A to 4G are graphs showing various wave forms at different designated points of the circuit of FIGURE 2.

The apparatus of the present invention is intended for continuously sensing, monitoring and recording the blood pressure and pulse produced from the beating heart. This is done by measuring the resistance or impedance between a pair of spaced electrodes maintained in contact with an extremity, such as a finger, toe, or ear lobe. For example, an extremity compressor may be employed of the type described in detail in my copending application Serial No. 263,932, filed March 8, 1963, and entitled, "Apparatus for Measuring Blood pressure and Heartbeat pulses," which issued as U.S. Patent No. 3,156,237 on Nov. 10, 1964. This extremity compressor is designated generally at 11 in FIGURE 1, and the spaced electrodes are shown schematically at 22 and 23.

The pulses detected at the electrodes 22 and 23 are amplified and control the pressure from a fluid pressure source 37. The device, at 2.5-second intervals, permits small amounts of blood to flow into the extremity, maintaining viability and allowing continuous blood pressure and pulse monitoring observations to be carried out over periods of many hours, or days. As will be presently explained, the device responds to a signal derived from the changes in impedance between the electrodes caused by pulses of blood, and continuously monitors for an increasing or decreasing blood pressure.

Figure 3:
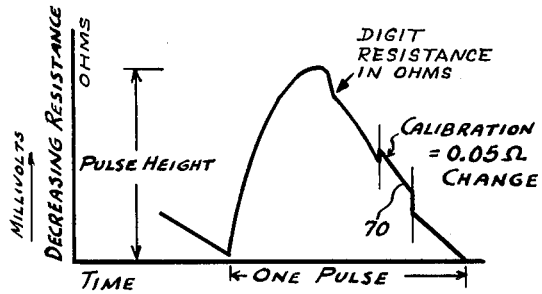
FIGURE 3 is a graph showing the change in resistance (or conductivity) occurring between two spaced electrodes in contact with an extremity as a pulse of blood flows into the extremity.

Blood has a specific conductivity for electricity greater than other body tissue, and the specific resistance or electrical impedance between two spaced points along an extremity is perceptibly reduced as each blood pulse wave flows into the extremity, dilating the arteries, arterioles and capillaries, respectively, of the vascular tree. Although the resistance changes are relatively small, they are measurable. FIGURE 3 is a reproduction of a recording taken from the index finger of a normal subject, using two small electrodes similar to 22 and 23 of FIGURE 1. The average resistance between the electrodes was approximately 500 ohms. The calbration portion 70 on the curve represents a change in resistance of 0.05 ohm.

Figure 1:
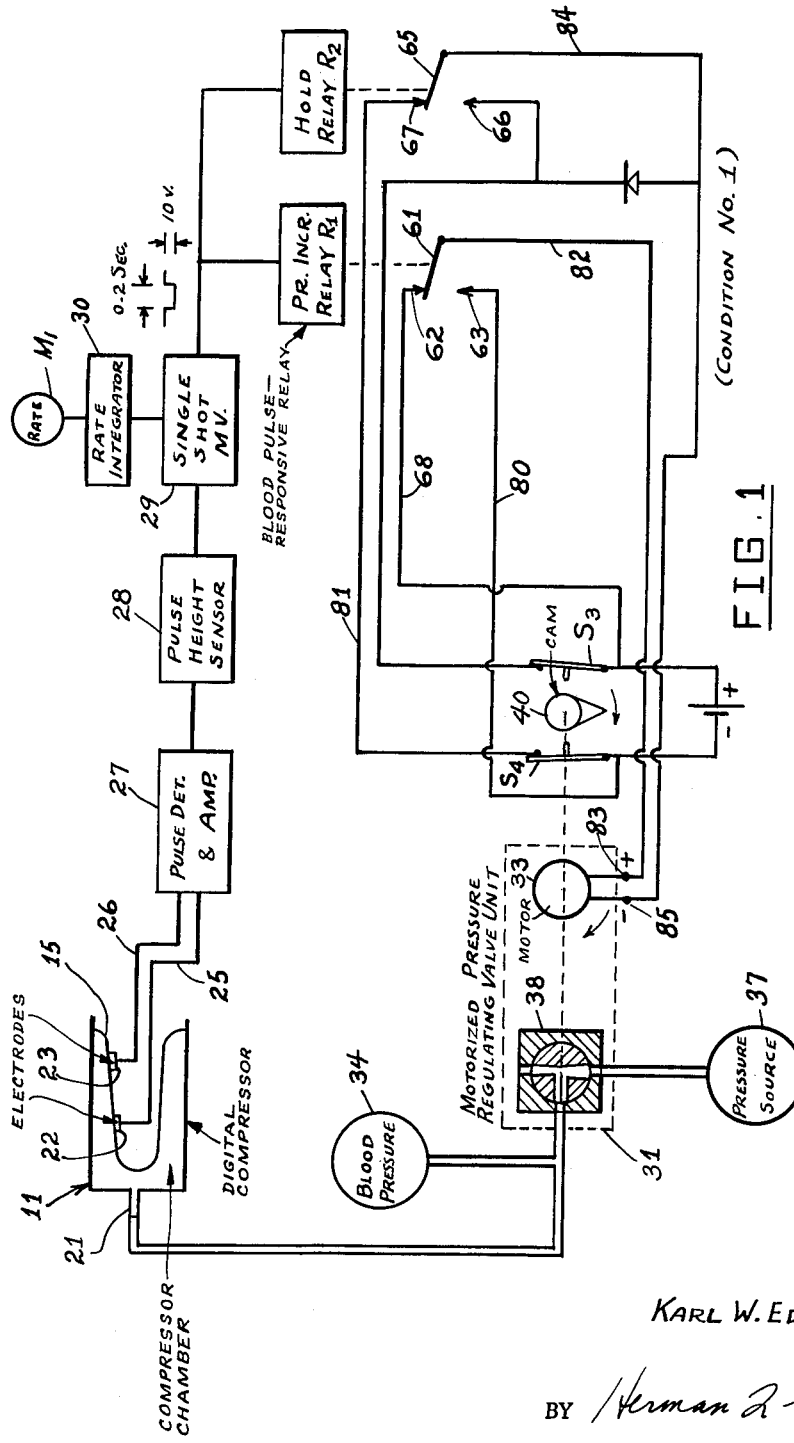
FIGURE 1 is a generalized block diagram showing an improved blood pressure and pulse rate monitoring system according to the present invention.

FIGURE 1 illustrates the general arrangement and operation of the apparatus. The digital blood pulse produces an electrical signal derived from the change in resistance between the electrodes 22, 23. This signal is amplified by the pulse detector and amplifier 27 to a value where it will trigger a pulse-height sensor 28, which in turn triggers a single-shot multivibrator 29, producing a 0.2 second pulse. The 0.2 second pulse from the multivibrator produces three actions:

(1) It closes a relay $R_1$ for the duration of the negative-going multivibrator pulse,
(2) It closes a relay $R_2$ through a relay hold circuit for a minimum of 2.5 seconds, and
(3) It is directly integrated in a rate integrator 30 to give the pulse rate on a meter $M_1$ in beats per minute. The rate integrator 30 has a time constant of between 6 and 10 seconds.

As will be presently seen, the blood pulse-derived signal may cause a valve means 38 associated with the fluid pressure source 37, and connected to the inlet conduit 21 of the digital compressor 11, to open slightly and increase the pressure in the chamber 15 of the digital compressor sufficiently to reduce the amplitude of further signal pulses from the extremity.

A small reverse-biasing voltage is maintained on the D.C. motor 33 operating the regulator valve 38 of a motorized pressure-regulating valve unit 31, and in the absence of any multivibrator output, this biasing voltage operates to gradually close the valve pressure fluid supply passage and simultaneously vent the chamber 15 of the digital compressor, decreasing the digital compressor pressure until the low pressure limit switch $S_3$ opens by the action of a cam 40, stopping the reverse rotation of the valve positioning motor 33. At some point, a pulse from the multivibrator will come through and the pressure regulator valve will be opened slightly to admit pressure fluid, increasing the pressure in the chamber 15 and reducing the amplitude of further pulses from the digit.

The system has four conditions, and with these conditions and the absence or presence of pulse output from the pulse-height sensor 28, the system switches automatically into any one of three of the four possible condition modes, and in so doing automatically measures the blood pressure. The following table gives the condition modalities of the system:

| Condition | Digital pulses | Hold relay $R_2$ | Function |
| --- | --- | --- | --- |
| No. 1 | Sensed | Energized | Increases digital compressor pressure. |
| No. 2 | Not sensed | do | Holds digital compressor pressure for 2.5 seconds. |
| No. 3 | do | Deenergized | Decreases digital compressor pressure. |
| No. 4 | do | do | Initial stable condition; switch $S_3$ open. |

It will be noted that the initial condition No. 4 differs from condition No. 3 only in that in the former the low pressure limit switch $S_3$ is open.

During operation, the blood pressure is noted on a gauge 34 and recorded in condition No. 2. At any instant that the blood pressure increases, the first pulse automatically switches the instrument into condition No. 1. Between each pulse, condition No. 2 is automatically returned to. The absence of a pulse for 2.5 seconds and/or a heart rate below 24 beats per minute switches the instrument into condition No. 3, where it remains until the first pulse at the lower blood pressure returns it to condition No. 1. While measuring the blood pressure, the operation mode is 3–1–2 while scanning for a lower pressure, and 2–1–2 while scanning for a higher pressure. The instrument continuously and automatically carries out one operation mode or the other and thus is either looking for a higher, or lower, blood pressure. The frequency of the condition switching is determined by the heart of pulse rate of the patient.

The above-mentioned operation modes are summarized as follows:

Operation (condition sequence):               Function
    3–1–2 _____ Scanning for lower blood pressure, recording pulse rate.
    2–1–2 _____ Scanning for higher blood pressure, recording pulse rate.

The cam 40 driven by motor 33 operates the low pressure limit switch $S_3$ and the high pressure limit switch $S_4$.

The regulating valve assembly 31 may be similar to Model No. 11–018–002 manufactured by C. A. Norgren Company, 3401 South Elati Street, Englewood, Colorado.

Figure 2:
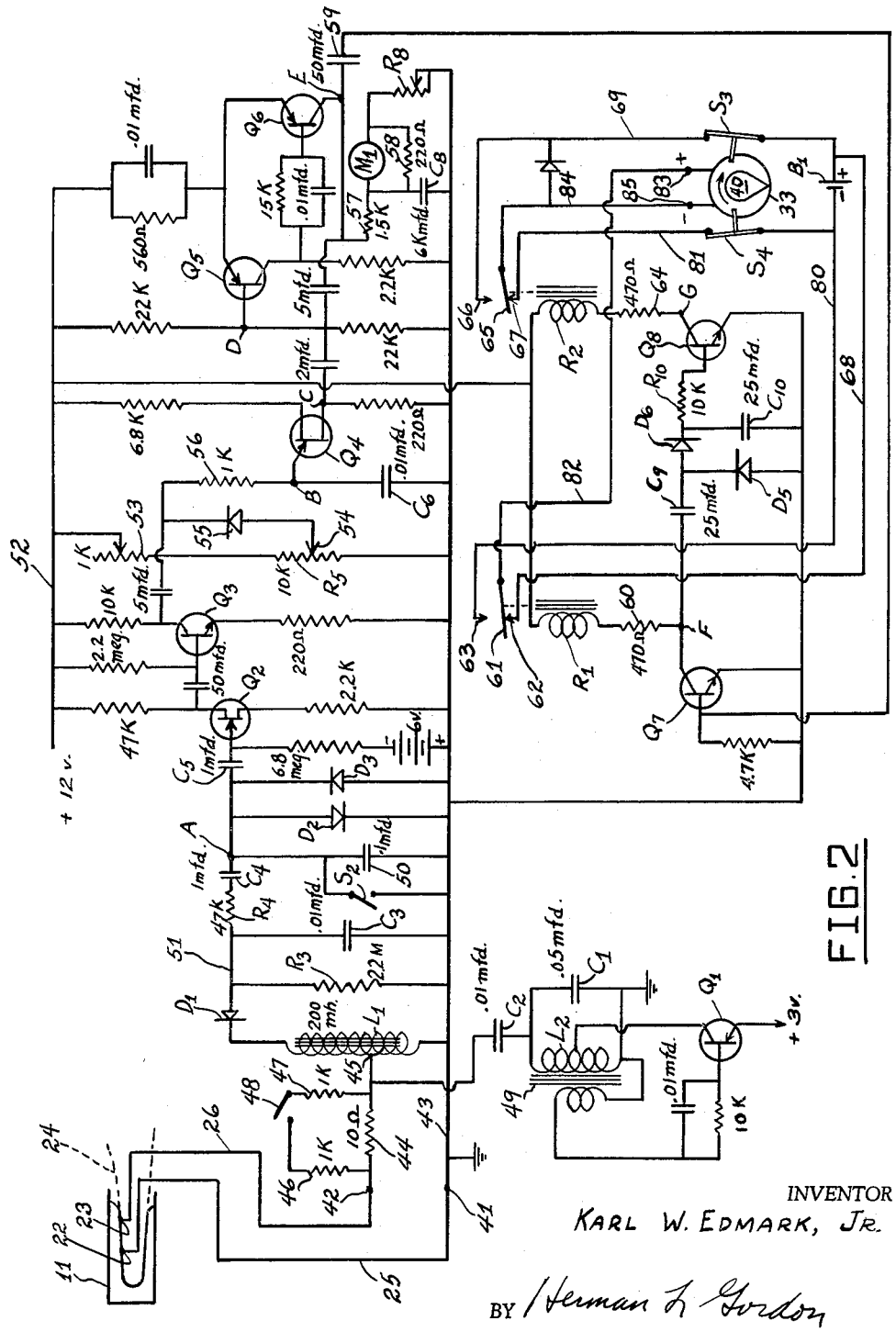
FIGURE 2 is a detailed schematic wiring diagram showing the electrical circuit of the apparatus of FIGURE 1.

Referring to FIGURE 2, the average impedance of a finger 24 received in the digital compressor 11, with the electrodes 22 and 23 spaced apart by one inch, is 300 to 500 ohms at 25 kilocycles. The digital electrodes are connected by the wires 25 and 26 to the input terminals 41 and 42 of the circuit, the terminal 41 being connected to a grounded wire 43. Terminal 42 is connected through a 10 ohm calibration resistor 44 to a tap 45 on autotransformer $L_1$. The tap 45 is at a location providing 2 millihenries to ground, representing an inductive reactance of 380 ohms at 25 kc., providing impedance matching to the digit. The Q of such a circuit is approximately 0.003, and as such is critically damped and incapable of self-oscillation.

The calibration resistor 44 may be shunted by a series circuit connected thereacross comprising two 1000 ohm resistors 46 and 47 and a switch 48, which when closed, simulates a change of 0.05 ohm in the input circuit.

A transistor $Q_1$ is connected in a conventional Hartley oscillator circuit including a transformer 49 having a secondary $L_2$ of 0.8 millihenry, across which is connected a condenser $C_1$ of 0.05 mfd., to provide a resonant frequency of between 25 and 30 kc. The oscillator is coupled to the tap 45 through a condenser $C_2$ of 0.01 mfd., providing a 1½ volt sine wave across the lower tap side of auto-transformer $L_1$, with the digit impedance in shunt. The total inductance of $L_1$ is 200 millihenries, and sufficient shunt capacitance is present in the winding to make it self-resonant between 25 and 30 kc. The Q of this entire circuit in the unloaded condition is approximately 100; when the input is loaded, it is reduced to 30. With a Q greater than 0.5, the driven inductor $L_1$ is not critically damped, and as such is capable of self-resonance when driven at its resonance frequency by the oscillator circuit containing transistor $Q_1$ and coupling capacitor $C_2$.

Parallel-connected resistor $R_3$ of 2.2 megohms and capacitor $C_3$ of 0.01 mfd. are connected across $L_1$ through diode $D_1$. Through the half-wave rectifying action of diode $D_1$, a negative D.C. voltage of minus 100 volts is maintained across resistor $R_3$ and capacitor $C_3$ when the input is unloaded. In the loaded condition, this voltage is reduced to minus 30 volts.

Figure 4D:
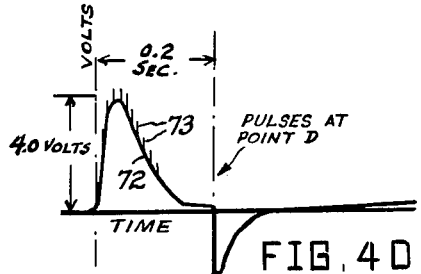
Figure 4A:
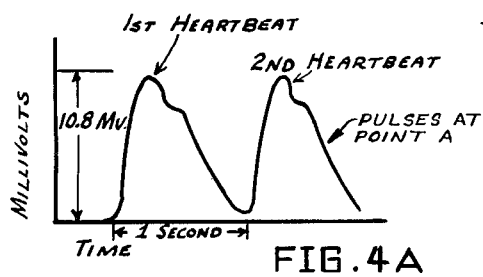

The output wire 51 from diode $D_1$ is connected through a resistor $R_4$ of 47,000 ohms and a capacitor $C_4$ of 1 mfd. to a point A. A condenser 50 is connected between point A and ground wire 43, and a standby switch $S_2$ is connected across said condenser 50. With standby switch $S_2$ closed, point A is grounded. After a period of time with switch $S_2$ closed, wherein the oscillator and its load is permitted to develop a stable −30 volt D.C. voltage across resistor $R_3$, the opening of standby switch $S_2$ will permit any small *change* of voltage to be transmitted to point A through the limiting resistor $R_4$ and the isolating capacitor $C_4$. As shown in FIGURE 4A, the pulse amplitudes may range from about 1 to 10.8 millivolts in pulse height. Condenser 50 has a capacity of 0.1 mfd.

Parallel reversed diodes $D_2$ and $D_3$ are connected between point A and ground, said diodes having forward Zener voltages in excess of 10 millivolts and presenting high impedance to changing voltages below this value but decreasing impedance to higher voltage, providing stability for the circuit.

As was mentioned above, and as is illustrated in FIGURE 3, a given change in the input resistance produces a corresponding definite change in the voltage at point A. If the 0.05 ohm change in input resistance above mentioned produces a 2 mm. change in pulse height on the curve at 70) it can be easily shown that the 27 mm. pulse height shown in FIGURE 3 corresponds to a resistance change of $27/2 \times 0.05$, or 0.675 ohm. As shown by FIGURE 4A, the voltage change corresponding to the 0.675 ohm change in resistance is 10.8 millivolts. Therefore, the 0.675 ohm decrease in resistance lowers the average rectified −30 volts D.C. by 10.8 millivolts, due to increased loading and thus a reduced Q. This change, being a positive one, results in a positive 10.8 millivolt pulse appearing at point A, shown in FIGURE 4A. A coupling capacitor $C_5$ of 1 mfd. transmits this voltage change to the gate electrode of a high input impedance field effect transistor $Q_2$.

Figure 4E:
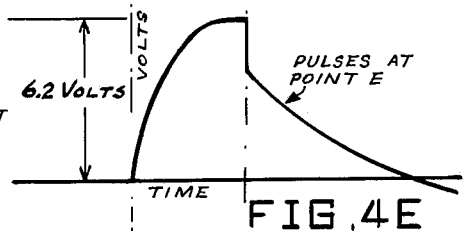
Figure 4B:
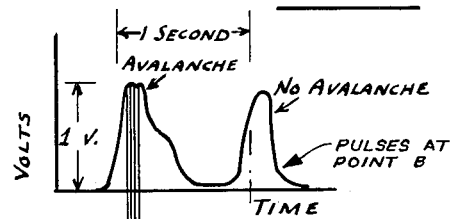

The output from transistor $Q_2$ is then amplified in a conventional amplifier circuit including a transistor $Q_3$, and appears at a point B in the form illustrated in FIGURE 4B, said point B being connected to the source or emitter electrode of a unijunction transistor $Q_4$. A variable resistor 53, of 1000 ohms maximum value, and a potentiometer resistance $R_5$ are connected in series between the positive voltage supply wire 52 and the ground wire 43. The sliding tap 54 of the potentiometer $R_5$ is connected through a diode 55 and a 1000 ohm resistor 56 to the point B, so as to bias the source or emitter of transistor $Q_4$ at a variable level. Unijunction transistor $Q_4$ by its design will avalanche at a point when its peak point voltage or current is reached. By increasing the positive reference voltage with potentiometer $R_5$, transistor $Q_4$ will avalanche with a smaller positive voltage. Decreasing the reference voltage lowers the sensitivity, and as such, pulse-height sensing transistor $Q_4$ can be set to avalanche at the beginning or at the very peak of any digital pulse coming through. Potentiometer $R_5$ is 10,000 ohms.

FIGURE 4B shows the typical wave form obtained when two pulses come through with approximately a 1 second interval between them, the larger pulse avalanching the pulse-height sensing transistor $Q_4$ and the smaller pulse producing no avalanche.

Figure 4C:
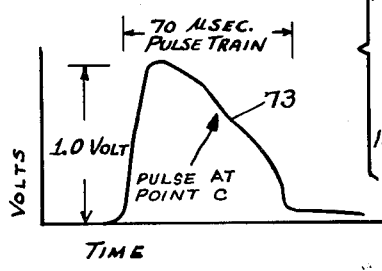

FIGURE 4C shows the wave form of one of the pulses generated at a base terminal C of pulse-height sensing unijunction transistor $Q_4$. A train of these pulses is generated. A capacitor $C_6$, connected between point B and ground wire 43, has a value of .01 mfd., chosen to produce pulse trains of plus 1 volt and 70 microseconds duration. The number of these pulses is influenced by the amplitude of the voltage pulse from the digit, amplified and appearing at point B. A 1 millivolt increase in voltage produces a series of these 70 microsecond pulse trains for a total duration of 210 milliseconds. The first avalanche so produced by unijunction transistor $Q_4$ appears at the base (point D) of a transistor $Q_5$ as small amplified 70 microsecond pulses. The large pulse 72 generated by the multivibrator is shown in FIGURE 4D, and has superimposed on it the small triggering impulses 73 from the unijunction transistor $Q_4$. The single shot multivibrator consists of transistors $Q_5$ and $Q_6$, $Q_5$ being normally on and $Q_6$ normally off.

The first positive-going pulse at the base of transistor $Q_5$ (point D) switches it from the conducting to the nonconducting condition, producing a postive-going square wave at point E, the collector of PNP transistor $Q_6$. FIGURE 4E shows that this has an amplitude of 6.2 volts and a duration of 0.2 second.

Connected between point E and ground wire 43 is the rate integrator circuit comprising resistor 57, of 1500 ohms, meter $M_1$, and variable resistor $R_8$ connected in series, with a capacitor $C_8$ of 6000 mfd. connected between the junction of resistor 57 and meter $M_1$ and ground wire 43. A resistor 58, of 220 ohms, is connected across meter $M_1$. By integration across capacitor $C_8$ and variable resistor $R_8$, increasing heartbeat rate produces a long scale increase in voltage indicated on meter $M_1$, which is suitably calibrated to indicate the heartbeat rate in beats per minute.

The switching on of normally non-conducting transistor $Q_6$ produces a postive-going 0.2 second square wave, which is coupled through a capacitor 59 of 50 mfd. to the base of a NPN transistor $Q_7$, being amplified by this transistor, and producing a negative voltage at its collector (point F). The winding of relay $R_1$ is connected between point F and positive supply wire 52 through a resistor 60 of 470 ohms. The resulting voltage drop across relay $R_1$ energizes same, moving its pole 61 from its normal engagement with upper relay contact 63 in FIGURE 2 into engagement with lower relay contact 62.

Figure 4G:
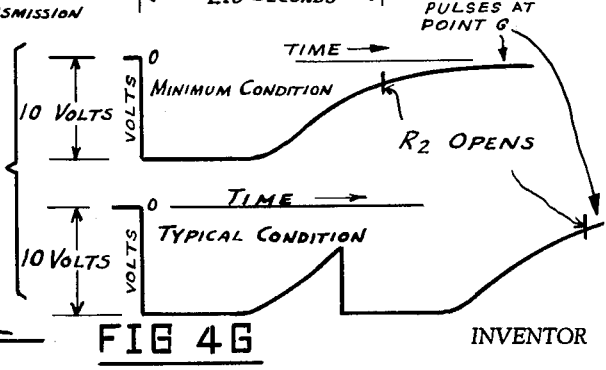

FIGURE 4F shows the form of the square negative voltage wave 74 at point F. This negative-going square wave 74 is transmitted through a coupling capacitor $C_9$ of 25 mfd. and through a diode $D_6$ and a resistor $R_{10}$ of 10,000 ohms to the base of a NPN transistor $Q_8$. A diode $D_5$ is connected between the junction of diode $D_6$ and condenser $C_9$ and ground, and a capacitor $C_{10}$ of 25 mfd. is connected between the junction of diode $D_6$ and resistor $R_{10}$ and ground. The diodes $D_5$ and $D_6$ are poled so as to provide a rectifying action causing a positive voltage to appear at the base of NPN transistor $Q_8$, which exponentially decays with time, with a time constant determined by the base-to-emitter resistance of transistor $Q_8$ in series with the resistor $R_{10}$. The wave form appearing at point G, the collector of transistor $Q_8$, is shown in FIGURE 4G.

Point G is connected to positive supply wire 52 through a resistor 64 of 470 ohms and the winding of the relay $R_2$. The 10 volt negative pulse at point G is sufficient to hold relay $R_2$ energized for a minimum duration of 2.5 seconds, and a maximum duration determined only by the sequence of impulses occurring at intervals of less than 2.5 seconds.

When relay $R_2$ is energized it moves its pole 65 from engagement with its upper contact 66 in FIGURE 2 into engagement with lower contact 67. (The upper and lower relay contacts of FIGURE 1 correspond respectively with the lower and upper relay contacts of FIGURE 2).

A battery $B_1$ has its positive pole connected by a wire 68 to the contact 62 of relay $R_1$ and through the low pressure limit switch $S_3$ and a wire 69 to the contact 66 of relay $R_2$. The battery $B_1$ has its negative pole connected by a wire 80 to the contact 63 of relay $R_1$ and through the high pressure limit switch $S_4$ and a wire 81 to the contact 67 of relay $R_2$. Pole 61 of relay $R_1$ is connected by a wire 82 to one terminal 83 of motor 33 and pole 65 of relay $R_2$ is connected by a wire 84 to the remaining terminal 85 of the motor.

With both relays energized, as in FIGURES 1 and 2, and with both limit switches $S_3$ and $S_4$ closed, the motor 33 is energized to move the rotor of valve 38 in a direction to increase digital pressure, which is Condition No. 1 above described. This is the condition which occurs responsive to a pulse of increasing blood pressure (a heartbeat pulse). Between heartbeat pulses motor 33 will be energized by the opening of relay $R_1$ since it is held closed for 0.2 second only, the period of the multivibator and the approximate duration of a heartbeat pulse. The opening of switch $S_4$ (upper pressure limit), prevents further pulsatile forward movement of motor 33 and thus sets the maximum pressure limit, even if additional pulses come through. Relay $R_1$ deenergizes after each pulse; however, relay $R_2$ requires the absence of a pulse for at least 2.5 seconds to become deenergized. The absence of a heartbeat pulse for 2.5 seconds, and/or a heartbeat rate below 24 beats per minute, therefore returns the instrument to Condition No. 3, wherein the motor 33 becomes energized in a reverse direction, namely, to reduce the digital compressor pressure. The motor will again become deenergized when switch $S_3$ opens (lower pressure limit), and the instrument will remain in Condition No. 3 until the next heartbeat pulse at the lower blood pressure returns it to Condition No. 1, namely, energizes relays $R_1$ and $R_2$.

While a specific embodiment of an improved blood pressure and heartbeat pulse rate measuring system has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a blood pressure and heartbeat measuring apparatus, a pneumatic compressor containing fluid under pressure and having an extremity-receiving cavity provided with a pair of electrodes engageable with spaced surface portions of an extremity received in said cavity, pressure-indicating means connected to said compressor, electrical impedance-responsive means connected to said electrodes, pressure-modulating means connected to said compressor and changing the compressor fluid pressure in one direction when energized and in the opposite direction when deenergized, and means to energize said pressure-modulating means responsive to a predetermined change in impedance across said electrodes.

2. In a blood pressure and heartbeat measuring apparatus, a pneumatic compressor containing fluid under pressure and having an extremity-receiving cavity provided with a pair of electrodes engageable with spaced surface portions of an extremity received in said cavity, pressure-indicating means connected to said compressor, electrical impedance-responsive means connected to said electrodes, pressure-modulating means connected to said compressor and changing the compressor fluid pressure in one direction when energized and in the opposite direction when deenergized, and means to energize said pressure-modulating means for a minimum predetermined time period responsive to a predetermined change in impedance across said electrodes.

3. In a blood pressure and heartbeat measuring apparatus, a pneumatic compressor containing fluid under pressure and having an extremity-receiving cavity provided with a pair of electrodes engageable with spaced surface portions of an extremity received in said cavity, pressure-indicating means connected to said compressor, electrical impedance-responsive means connected to said electrodes, pressure-modulating means connected to said compressor and changing the compressor fluid pressure in one direction when energized and in the opposite direction when deenergized, means limiting the maximum and minimum values of fluid pressure in said compressor, and means to energize said pressure-modulating means responsive to a predetermined change in impedance across said electrodes.

4. In a blood pressure and heartbeat measuring apparatus, a pneumatic compressor containing fluid under pressure and having an extremity-receiving cavity provided with a pair of electrodes engageable with spaced surface portions of an extremity received in said cavity, pressure-indicating means connected to said compressor, electrical impedance-responsive means connected to said electrodes, pressure-modulating means connected to said compressor and changing the compressor fluid pressure in one direction when energized and in the opposite direction when deenergized, means to energize said pressure-modulating means for a minimum predetermined time period responsive to a predetermined change in impedance across said electrodes, means limiting the maximum and minimum values of fluid pressure in said compressor, and means to indicate the frequency of the changes in impedance across said electrodes.

5. In a blood pressure and heartbeat measuring apparatus, a pair of spaced electrodes, means to hold said electrodes against spaced surface portions of an extremity, whereby the impedance across said electrodes will vary with pulses of blood through the extremity, impedance-sensing means connected to said electrodes and generating electrical pulses corresponding to the variations of impedance, means to measure the frequency of the electrical pulses, said holding means comprising a pneumatic compressor receiving the extremity and a source of pressure fluid connected to said compressor, means to measure the pressure in said compressor, a pressure-regulating valve connected between said source and said compressor, and means to adjust said valve in accordance with the amplitude of said electrical pulses, said adjusting means comprising a pair of relays, means adjusting the valve in one direction responsive to the energization of the relays and in an opposite direction when the relays are deenergized, and means energizing said relays when the amplitude of the electrical pulses exceeds a predetermined value.

6. The structure of claim 5, and means limiting the degree of adjustment of said valve.

7. The structure of claim 5, and means maintaining at least one of said relays energized for a predetermined minimum time period after it becomes energized.

8. The structure of claim 7, and means limiting the maximum and minimum pressure value points of adjustment of said valve.

9. In a blood pressure and heartbeat measuring apparatus, a pneumatic compressor containing fluid under pressure and having an extremity-receiving cavity containing a pair of spaced electrodes adapted to be held by the fluid pressure in the compressor against spaced surface portions of an extremity received in said cavity, the impedance across the electrodes varying with pulses of blood through the extremity, an impedance-responsive pulse detector connected to said electrodes and generating electrical pulses corresponding to variations of such impedance, a pulse height sensor connected to the output of said pulse detector, a single shot multivibrator connected to the output of the pulse height sensor and being triggered when an electrical pulse above a predetermined amplitude is received by the sensor, frequency measuring means connected to the output of said multivibrator, a source of fluid pressure connected to the compressor, means to measure the pressure in said compressor, a pressure-regulating valve connected between said source and said compressor, and means to adjust the valve responsive to the triggering of said multivibrator.

10. The structure of claim 9, and wherein said valve-adjusting means comprises a pair of relays, means energizing said relays responsive to the triggering of said multivibrator, and means to operate said valve responsive to the energization of said relays.

11. In a blood pressure and heartbeat measuring apparatus, a pneumatic compressor containing fluid under pressure and having an extremity-receiving cavity containing a pair of spaced electrodes adapted to be held by the fluid pressure in the compressor against spaced surface portions of an extremity received in said cavity, the impedance across the electrodes varying with pulses of blood through the extremity, an impedance-responsive pulse detector connected to said electrodes and generating electrical pulses corresponding to variations of such impedance, a pulse height sensor connected to the output of said pulse detector, a single shot multivibrator connected to the output of the pulse height sensor and being triggered when an electrical pulse above a predetermined amplitude is received by said sensor, frequency measuring means connected to the output of said multivibrator, a source of fluid pressure connected to said compressor, means to measure the pressure in said compressor, a pressure-regulating valve connected between said source and said compressor, means biasing said valve toward a position to decrease the fluid pressure in the compressor, relay means, means to operate said valve in a direction to increase the fluid pressure in the compressor responsive to energization of said relay means, and means to energize said relay means responsive to the triggering of the multivibrator.

12. The structure of claim 11, and means limiting the maximum pressure and minimum pressure positions of the valve.

13. The structure of claim 12, and means to maintain the relay means energized for a minimum predetermined time period subsequent to the initial energization thereof.

14. In a blood pressure and heartbeat measuring apparatus, a pneumatic compressor containing fluid under pressure and having an extremity-receiving cavity containing a pair of spaced electrodes adapted to be held by the fluid pressure in the compressor against spaced surface portions of an extremity received in said cavity, the impedance across the electrodes varying with pulses of blood through the extremity, an impedance-responsive pulse detector connected to said electrodes and generating electrical pulses corresponding to variations of such impedance, a pulse height sensor connected to the output of said pulse detector, a single shot multivibrator connected to the output of the pulse height sensor and being triggered when an electrical pulse above a predetermined amplitude is received by said sensor, frequency measuring means connected to the output of said multivibrator, a source of fluid pressure connected to said compressor, means to measure the pressure in said compressor, a pressure-regulating valve connected between said source and said compressor, a pair of relays, means to operate said valve responsive to energization of said relays, a source of current, means to energize one of said relays from said source of current responsive to the triggering of the multivibrator, a capacitor, means connecting the other relay to said source of current through the capacitor, means to simultaneously energize said other relay and charge the capacitor responsive to the triggering of the multivibrator, and resistance means connected across the capacitor adapted to maintain said other relay energized for a predetermined time period while the capacitor discharges subsequent to triggering of the multivibrator.

15. In a blood pressure and heartbeat measuring apparatus, a pneumatic compressor containing fluid under pressure and having an extremity-receiving cavity containing a pair of spaced electrodes adapted to be held by the fluid pressure in the compressor against spaced surface portions of an extremity received in said cavity, the impedance across the electrodes varying with pulses of blood through the extremity, an impedance-responsive pulse detector connected to said electrodes and generating electrical pulses corresponding to variations of such impedance, a pulse height sensor connected to the output of said pulse detector, a single shot multivibrator connected to the output of the pulse height sensor and being triggered when an electrical pulse above a predetermined amplitude is received by said sensor, frequency measuring means connected to the output of the multivibrator, a source of fluid pressure connected to said compressor, means to measure the pressure in said compressor, a pressure-regulating valve connected between said source and said compressor, a pair of relays, means to operate said valve responsive to energization of said relays, a source of current, means to energize one of said relays from said source of current responsive to the triggering of the multivibrator, a transistor having a base, a collector and an emitter, means connecting said emitter, collector and the other relay in circuit across said source of current, means connecting the multivibrator output to said base to gate the transistor responsive to triggering of the multivibrator, and capacitive means connected between the base and emitter to maintain said other relay energized for a predetermined time period subsequent to triggering of the multivibrator.

16. The structure of claim 15, and means limiting the maximum pressure and minimum pressure positions of the valve.

17. The structure of claim 16, and means biasing the valve towards its minimum pressure limiting position.

References Cited by the Examiner
UNITED STATES PATENTS

| | | | |
|---|---|---|---|
| 2,634,721 | 4/1953 | Greenwood | 128—2.05 |
| 2,944,542 | 7/1960 | Barnett et al. | 128—2.05 |
| 3,051,165 | 8/1962 | Kompelien | 128—2.05 |
| 3,156,237 | 11/1964 | Edmark | 128—2.05 |

RICHARD A. GAUDET, *Primary Examiner.*

SIMON BRODER, *Examiner.*